Sept. 15, 1964 K. W. TANTLINGER 3,148,909
SPREADER BAR FOR CONTAINERS
Filed Feb. 23, 1962 2 Sheets-Sheet 1
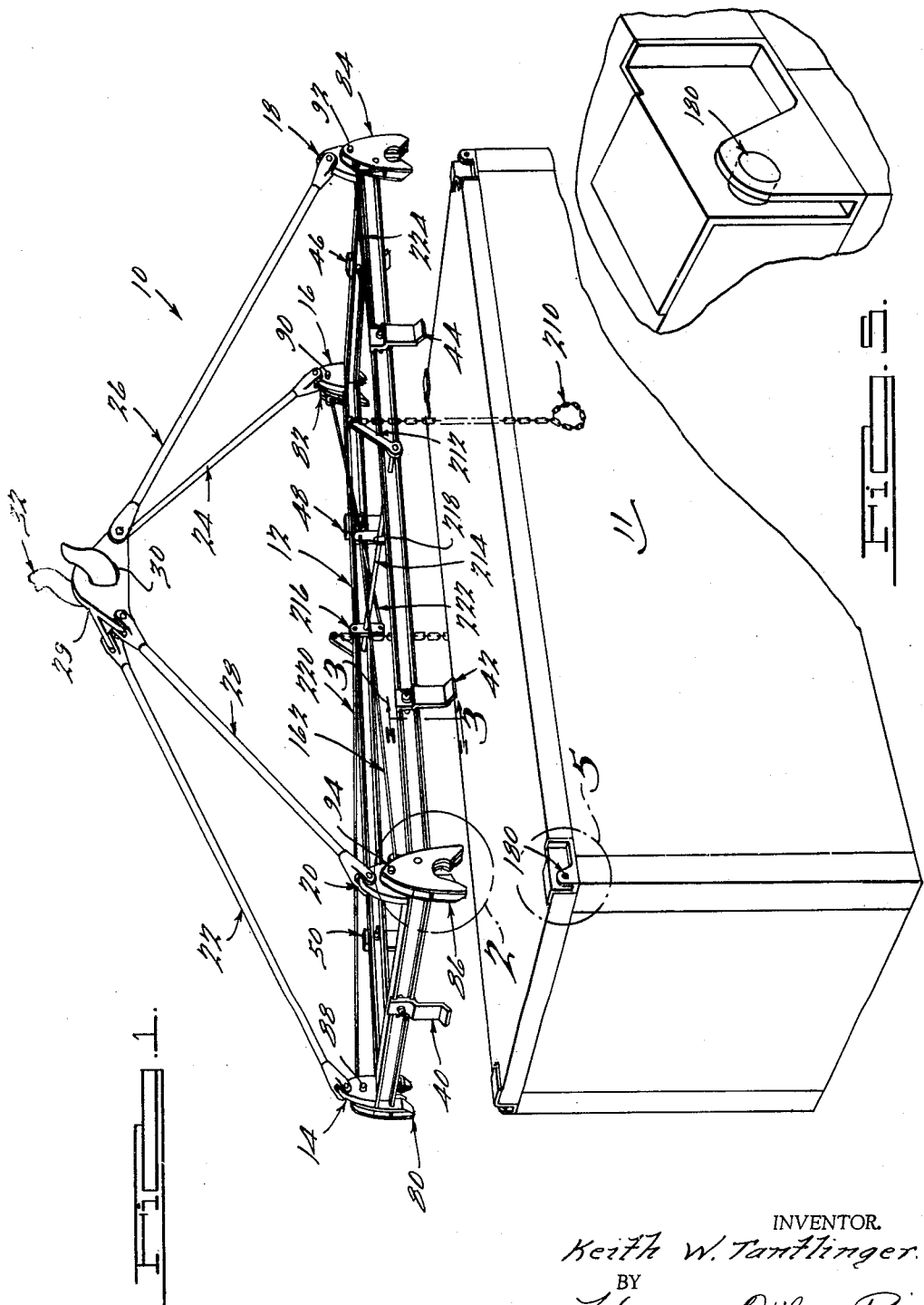
INVENTOR.
Keith W. Tantlinger.
BY
ATTORNEYS.

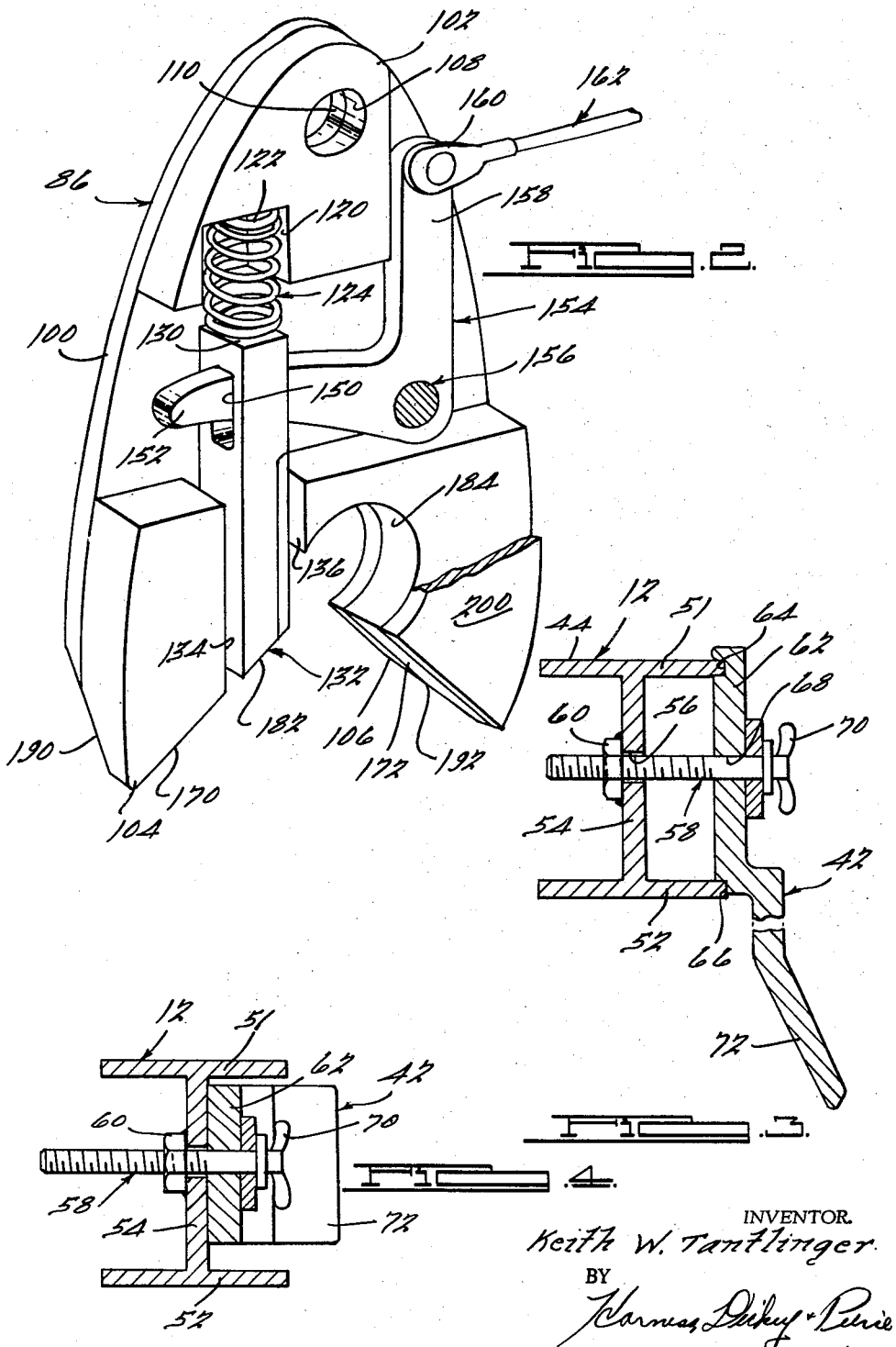

United States Patent Office 3,148,909
Patented Sept. 15, 1964

3,148,909
SPREADER BAR FOR CONTAINERS
Keith W. Tantlinger, Grosse Pointe Shores, Mich., assignor to Fruehauf Corporation, Detroit, Mich., a corporation of Michigan
Filed Feb. 23, 1962, Ser. No. 175,074
1 Claim. (Cl. 294—81)

This invention relates generally to shipping apparatus and more particularly to an improved spreader bar for handling shipping containers and the like.

The modern, modular, sealable shipping container has materially simplified the shipment of goods since it presents a package of optimum configuration for handling purposes. However, the use of such containers has emphasized the need for improved transfer equipment capable of expediting the handling of such containers between ship and dock, truck and warehouse, etc.

The present invention is directed to an improved manually operable spreader bar that materially facilitates handling of, for example, a generally rectangular shipping container of the type disclosed in application Serial No. 112,635, filed May 25, 1961, for: Shipping Apparatus and assigned to the assignee of the present invention.

A spreader bar in accordance with the instant invention comprises a rigid frame of generally rectangular horizontal cross section complementary to the shipping container. The frame is provided with a plurality of retractable downwardly extending gathering and aligning arms to effect horizontal movement of the spreader bar relative to the shipping container. The spreader bar has a plurality of downwardly extending container couplers that are pivotally supported for rotation about horizontal lateral axes with respect to the spreader bar. The couplers have novel self-aligning jaws for automatically engaging complementary laterally extending pins on the upper corners of the shipping container. The couplers are automatically locked to the container and manually releasable therefrom.

Accordingly, one object of the present invention is an improved spreader bar.

Another object is an improved manually operable spreader bar.

Another object is a spreader bar having a plurality of retractable aligning arms.

Another object is an improved coupler for a spreader bar.

Another object is a coupler for a spreader bar that is self-locking with respect to a shipping container.

Other objects and advantages of the present invention will be apparent from the following specification, claims and drawings, wherein:

FIGURE 1 is a perspective view of a spreader bar in accordance with an exemplary constructed embodiment of the present invention shown in the ready-to-couple position with respect to a shipping container;

FIG. 2 is an enlarged view taken within the circle 2 of FIGURE 1;

FIG. 3 is a fragmentary cross-sectional view taken substantially along the line 3—3 of FIGURE 1;

FIG. 4 is a view similar to FIG. 3 showing the aligning arm rotated to the stored condition; and FIG. 5 is an enlarged view taken within the circle 5 of FIGURE 1.

As best seen in FIGURE 1, a spreader bar 10 in accordance with an exemplary embodiment of the present invention is shown in the ready-to-couple position with respect to a shipping container 11. The spreader bar 10 comprises a rigid, generally rectangular frame 12 formed of, for example, I beams that are secured to one another as by welding. The frame 12 has a plurality of upstanding cable brackets 14, 16, 18 and 20 at the corners thereof to facilitate the attachment of a plurality of conventional flexible cables 22, 24, 26 and 28 to the frame 12. The cables 22, 24, 26 and 28 are secured to a hook plate 29 having an aperture 30 therein for the acceptance of a conventional lift hook 32.

In accordance with one feature of the present invention, the frame 12 of the spreader bar 10 is provided with a plurality of retractable aligning arms 40, 42, 44, 46, 48 and 50 of like construction. The aligning arm 42 will be described in detail, it being understood that it is exemplary in constructive orientation and function of the other arms.

Referring to FIG. 3, the arm 42 is shown in operative condition with respect to the frame 12. The I-shaped vertical cross section of the frame 12 is defined by horizontal flange portions 51 and 52 connected by a vertical web portion 54. The web portion 54 has an aperture 56 therein for the acceptance of a locking screw 58 on the arm 42. The screw 58 is threadably engaged with a nut 60 that is secured to the web portion of the I beam as by welding.

The arm 42 comprises a body portion 62 having spaced parallel grooves 64 and 66 therein for the acceptance of the flange portions 51 and 52 of the frame 12, respectively. The locking screw 58 extends through a complementary aperture 68 in the body portion 62, a winged head 70 facilitating rotation thereof.

The arm 42 has a downwardly depending aligning portion 72 angularly related to the body portion 62 to provide for horizontal gathering of the spreader bar 10 with respect to the shipping container 11 as they move into engagement with one another.

As best seen in FIG. 4, the arm 42 is rotatable 90 degrees with respect to the frame 12, whereupon the locking screw 58 is rotated to draw the arm 42 into nested relationship against the web portion 54 of the frame 12. In this condition, the arm 42 is retracted sufficiently to permit movement of the spreader bar into, for example, the hold of a ship (not shown) having an access opening of minimum proportions.

In accordance with another feature of the instant invention, the spreader bar 10 is provided with a plurality of downwardly depending couplers 80, 82, 84 and 86. Since the couplers 80, 82, 84 and 86 are of similar construction, except for the right and left-hand orientation, only the coupler 86 will be described hereinafter.

It is to be noted that the couplers 80, 82, 84 and 86 are pivotally secured to the brackets 14, 16, 18 and 20, as by pins 88, 90, 92 and 94, respectively. Thus, the couplers 80, 82, 84, and 86 are rotatable relative to the frame 12 of the spreader bar 10 about horizontal axes, respectively.

As best seen in FIG. 2, the coupler 86 comprises a backing plate 100 for the support of an upper pivot block 102 and a pair of lower jaw blocks 104 and 106. The pivot block 102 and the plate 100 have apertures 108 and 110 therein, respectively, for the acceptance of the pin 94 (FIGURE 1).

The block 102 has a generally rectangular recess 120 therein for the acceptance of an upper end portion 122 of a helical compression spring 124. The spring 124 is engageable with an upper end face 130 of a vertically slidable locking bar 132 which is guided for vertical movement between a vertical face 134 on the jaw 104 and a vertical face 136 on the jaw 106. The width of the jaws 104 and 106 is slightly greater than the width of the slide 132, so that the slide 132 is freely movable vertically of the coupler 86.

The slide 132 has a vertically extending slot 150 therein for the acceptance of one arm 152 of a bellcrank 154.

The bellcrank 154 is supported for rotation relative to the plate 100 by a pin 156. The bellcrank 154 has an arm 158 that extends upwardly generally normal to the arm 152 thereof for engagement with an end portion 160 of an operating rod 162 (FIG. 2). Reciprocation of the rod 162 effects vertical movement of the end portion 152 of the bellcrank 154 thereby to effect vertical reciprocation of the slide 132.

The jaw blocks 104 and 106 have downwardly divergent end faces 170 and 172 thereon to effect gathering of the coupler 86 with respect, for example, to a pin 180 on the container 11. As the coupler 86 moves downwardly over the pin 180, a lower end face 182 of the slide 132 engages the pin 180, whereupon the slide is biased upwardly against the spring 124. Upward retraction of the slide 132 permits the pin 180 to move into a complementary circular recess 184 in the jaw block 106. After the pin 180 is within the recess 184 in the jaw block 106, the slide 132 is biased downwardly by the spring 124 to the locked condition, thereby to lock the coupler 86 about the pin 180.

It is to be noted that the inboard lower edge faces 190 and 192 of the jaw blocks 104 and 106, respectively, are angularly related to the plate 100, thereby to provide for lateral gathering of the spreader bar 10 with respect to the container 11 at such times as the arms 40, 42, 44, 46, 48 and 50 may be retracted. An outer plate 200 overlies the locks 102, 104 and 106, slide 132, spring 124 and bellcrank 154 to substantially enclose these components.

As best seen in FIGURE 1, unlocking of the couplers 80, 82, 84 and 86 from the container 11 is effected by pulling downwardly on a chain 210 that is secured to an arm 212 of a transverse shaft 214. A pair of vertically extending operating levers 216 and 218 are secured to the shaft 214 so as to be rotatable therewith. An operating rod 162 is secured to the upper end of the lever 218 so as to reciprocate upon rotation thereof. Similarly, operating rods 220 and 222 are secured to the upper and lower ends of the lever 216, respectively, and an operating rod 224 is secured to the lower end portion of the lever 218. Thus, rotation of the shaft 214, occasioned by pulling downwardly on the chain 210, effects reciprocation of the rods 162, 220, 222, and 224 thereby to effect vertical retraction of the locking slides associated with the couplers 86, 80, 82 and 84, respectively, whereupon the spreader bar 12 can be uncoupled from the container 11.

From the foregoing description, it should be apparent that the spreader bar of the instant invention is automatically coupled to a shipping container upon movement into juxtaposed relationship therewith. Movement of the spreader bar into engagement with the container is guided by downwardly extending aligning arms thereon, as well as by complementary angled surfaces on a plurality of couplers. Disengagement of the spreader bar 10 from the container 11 is accomplished by merely pulling downwardly on a single operator, for example, the chain 210.

It is to be understood that the specific construction of the improved spreader bar for containers herein disclosed and described is presented for the purpose of explanation and illustration and is not intended to indicate limits for the invention, the scope of which is defined by the following claim.

What is claimed is:

A spreader bar for handling a generally rectangular shipping container having a plurality of horizontally laterally extending lifting pins thereon, said spreader bar comprising a generally rectangular frame, a plurality of couplers pivotally secured to said frame, respectively, in an array complementary to associated pins on a shipping container, said couplers being rotatable about axes, respectively, generally parallel to associated lifting pins on a container, each of said couplers having a pair of jaws with upwardly convergent generally symmetrical gathering faces, respectively, leading into an enlarged generally circular recess at the apex thereof for the acceptance of an associated lifting pin on a shipping container, each of said couplers including a locking bar having an end face normally defining a portion of the gathering face on one of the jaws on said coupler, spring means normally biasing said locking bar to the lock condition wherein it precludes movement of an associated pin outwardly of the recess in said coupler, said locking bar being retractable upon engagement thereof with an associated pin on a shipping container upon movement of the pin into the recess in said coupler, a retracting mechanism coupled to the locking bar of said coupler by a lost motion connection so that the locking bar is individually movable to a retracted condition irrespective of the condition of the locking bars on the other of said couplers, and a common manual operator connected to the retracting mechanisms of said couplers for concomitantly retracting all of the locking bars on all of said couplers to condition said spreader bar for uncoupling from a shipping container.

References Cited in the file of this patent

UNITED STATES PATENTS

| | | |
|---|---|---|
| 649,460 | Jordon | May 15, 1900 |
| 1,651,607 | Kurtz | Dec. 6, 1927 |
| 2,080,813 | Fildes | May 18, 1937 |
| 2,547,502 | Smith | Apr. 3, 1951 |
| 2,847,245 | Leslie | Aug. 12, 1958 |
| 3,078,115 | Harlander | Feb. 19, 1963 |

FOREIGN PATENTS

| | | |
|---|---|---|
| 958,152 | Germany | of 1957 |